United States Patent Office

Re. 26,325
Reissued Dec. 19, 1967

26,325

AMMONIUM NITRATE EXPLOSIVE COMPOSITION CONTAINING AMMONIA

Joseph R. Hradel, Mount Pleasant, and Carl Kenneth Bjork, Midland, Mich., assignors to The Dow Chemical Company, Midland, Mich., a corporation of Delaware No Drawing. Original No. 3,094,443, dated June 18, 1963, Ser. No. 784,895, Jan. 5, 1959. Application for reissue June 9, 1965, Ser. No. 462,768
8 Claims. (Cl. 149—1)

Matter enclosed in heavy brackets [ ] appears in the original patent but forms no part of this reissue specification; matter printed in italics indicates the additions made by reissue.

This invention relates to an improved ammonium nitrate explosive composition and more particularly concerns a cap-insensitive ammonium nitrate explosive composition containing particulated light metal.

It has been a desideratum in the explosives art to formulate and compound explosive compositions which may be safely handled and transported, yet are reliably and effectively detonated. To fill this need various ammonium nitrate explosive compositions have been proposed but these have been generally cap-sensitive and have required boosters, such as gelatine dynamite, spaced throughout a large load to ensure good propagation.

It is an object of the present invention to provide a cap-insensitive ammonium nitrate explosive composition which may be safely handled and transported with little danger of shock initiation yet may be detonated effectively by a shaped charge using the Munroe jet principle.

It is another object of the invention to provide a cap-insensitive ammonium nitrate explosive composition which upon proper initiation produces a detonation of useful magnitude and force.

An additional object of the invention is to provide a cap-insensitive ammonium nitrate explosive composition containing a particulated light metal.

A still further object of the invention is to provide a low-cost cap-insensitive ammonium nitrate explosive composition which is adapted to be readily compounded near the point of use.

Other objects and advantages of the invention will become apparent to one skilled in the art upon becoming familiar with the following description and claims.

These and other objects are attained according to the invention upon admixing ammonium nitrate, itself cap-insensitive, with a particulated light metal and with an ammoniacal solution of ammonium nitrate, in proportions hereinafter more fully described and further illustrated by examples of the invention, whereby an admixture is formed having both liquid and solid phases. All proportions herein given in percent are to be understood as percent by weight unless otherwise indicated.

The composition of the invention may be compounded with fertilizer grade as well as with explosive grade ammonium nitrate. While the explosive grade material tends to detonate with slightly greater force on an equal weight basis it is generally more economical to make up for this by using a slightly greater amount of fertilizer grade ammonium nitrate.

Fertilizer grade ammonium nitrate generally contains various additives or fine particulate coatings inhibiting caking and promoting free-flowing characteristics of the material. Ammonium nitrate as referred to herein is defined as ammonium nitrate containing up to 3 percent of various additives such as wax, diatomaceous earth and chalk in addition to a moisture content ranging up to about 1½ percent. Either the granular or prilled form of the nitrate salt are satisfactory.

To avoid making cap-sensitive mixtures the composition is best prepared from ammonium nitrate having particle sizes mainly in the range of 8 to 100 mesh, fines passing 100 to 200 mesh tending to increase the sensitivity of the mixture. An example of a satisfactory granular ammonium nitrate readily obtained commercially has the following sieve analysis:

TABLE I

| Number of Sieve* Passed | Number of Sieve Retained on | Percent Retained |
|---|---|---|
| ---------- | 12 | .3 |
| 12 | 20 | 34.4 |
| 20 | 30 | 16.4 |
| 30 | 40 | 13.4 |
| 40 | 60 | 14.4 |
| 60 | 80 | 8.4 |
| 80 | 100 | 1.9 |
| 100 | 200 | 6.4 |
| 200 | pan | 4.4 |

*Sieves of the U.S. Sieve Series, U.S. Bureau of Standards.

An example of a satisfactory prilled ammonium nitrate which is commercially available has the following sieve analysis:

TABLE II

| Number of Sieve Passed | Number of Sieve Retained on | Percent Retained |
|---|---|---|
| ---------- | 6 | 0 |
| 6 | 10 | 56 |
| 10 | 12 | 24 |
| 12 | 14 | 9 |
| 14 | 20 | 9 |
| 20 | 35 | 2 |
| 35 | pan | trace |

The above examples are not intended to be limitative but indicative of the nature of commercially available ammonium nitrate.

The preferred light metal in particulated form is selected from the class consisting of magnesium and its alloys, aluminum and its alloys, and mixtures thereof, theoretical considerations indicating both magnesium and aluminum in reacting with ammonium nitrate evolve a greater amount of energy than most other common metals on an equal weight basis. Suitable metals and alloys which may be used in particulated form include magnesium and magnesium alloys having the ASTM designations ZK10, ZK60, AZ41, as well as AZ11 alloyed with 1 percent of manganese, ZK60 alloyed with 2 percent of thorium, magnesium alloyed with 2.8 percent of aluminum and 8.4 percent of zinc, magnesium-aluminum alloy containing 33 percent of aluminum, aluminum-magnesium alloy containing 30 percent of magnesium in addition to aluminum metal. Particulated magnesium, and magnesium base alloys containing aluminum only or minor amounts of other alloying elements are to be preferred in preparing explosive mixtures in the form of a slurry since the densities of magnesium and solid ammonium nitrate are nearly equal. The tendency for segregation of metal particles upon settling of solids from a composition of the invention is thus very slight.

While the particulated metals may be used in the form of ground or flaked particles a desirable form is that of atomized pellets, for example atomized metal pellets obtained as described in U.S. Patents 2,699,576 and 2,728,107.

Atomized metal pellets produced according to these U.S. patents referred to above are readily formed in a narrow range of particle sizes with little fines. As to detonability, the same limits of metal particle sizes generally apply whether the metal is ground or pelletized. However, slurries containing the more nearly spherical atomized metal pellets tend to be pumpable at lower liquid levels than slurries containing angular irregularly-shaped particulated metal. The following is a sieve analysis of a suitable pelletized magnesium base allow having the ASTM designation ZK60:

TABLE III

| Sieve Passed | Sieve Retained on | Percent Retained |
|---|---|---|
| 20 | 35 | 22 |
| 35 | 48 | 38 |
| 48 | 65 | 27 |
| 65 | 100 | 10 |
| 100 | pan | 3 |

Ground metals, as produced, are generally quite varied in particle size and usually contain a substantial amount of fines passing 200 and 325 mesh sieves. Not only are these fines rather easily ignited in air but they contribute to low level initiation of particulated ammonium nitrate in admixture therewith. Such fines are thus unsuitable in the preparation of cap-insensitive ammonium nitrate explosive mixtures. Ground metals may be used upon separating the fines, as by screening, and selecting particles about 85 percent of which are retained on a 140 mesh sieve and not more than 1 percent of which pass a 200 mesh sieve. It is also desirable to reject coarser metal particles not passing a 20 mesh sieve as these are too large to react effectively during the brief interval of the detonation reaction of ammonium nitrate, though the presence of a small percent of larger metal particles does not particularly adversely affect detonability of an ammonium nitrate explosive mixture. For ease of mixing and handling or pumping the composition of the invention it is to be preferred that the particulate solid light metal used have a particle size range, mainly, of 28 to 100 mesh, not more than 1 percent of the metal passing a 200 mesh sieve.

A suitable ammoniacal solution of ammonium nitrate is Divers liquid which is a saturated or nearly saturated anhydrous solution of ammonium nitrate in liquid ammonia containing generally about 70 to 80 percent of ammonium nitrate, depending on the temperature of the solution and the manner of preparing the solution. Divers liquid and a similar ammoniacal solution of ammonium nitrate containing, in addition, a small proportion of water is referred to herein as an ammoniacal solution of ammonium nitrate containing up to 15 percent of water. Aqueous ammoniacal solutions are commercially available at lower cost and are easier to handle than the anhydrous Divers liquid because of the reduced vapor pressure of ammonia in the presence of water. As an example, a solution consisting of 60 percent of ammonium nitrate, 34 percent of liquid ammonia and 6 percent of water is commercially available as the trademarked product Spensol D.

The explosive composition of the invention may be formed from ammonium nitrate, particulated metal and ammonia with or without water in the following proportions: 20 to 95 percent of ammonium nitrate, 1 to 65 percent of particulated metal, 2 to 50 percent of ammonia and up to 6 percent of water, the true range of composition being thus defined. A mixture of the explosive composition containing from 2 to 20 percent of ammonia may, however, be quite economically and practically prepared from the hereinabove described materials, namely, particulated ammonium nitrate, particulated metal and an ammoniacal solution of ammonium nitrate containing up to 15 percent of water, the proportions of ammoniacal solution ranging from about 8 to 80 percent of the total composition in the case of Diver's liquid and from about 5 to 60 percent of the total composition in the case of an aqueous ammoniacal solution such as Spensol D.

A mixture of the invention containing less than about 25 to 35 percent of liquid phase ammoniacal solution is generally readily loaded directly into accessible boreholes or, if desired, first placed into suitable containers such as flexible plastic bags and the containers placed in juxtaposition in a borehole. It is to be understood that in compositions having, under conditions of room temperature and atmospheric pressure, both dissolved ammonium nitrate and solid phase particulate ammonium nitrate, the relative amount of ammonium nitrate in each phase differs according to the conditions under which the mixture is held. Under constant pressure conditions the solubility of ammonium nitrate in ammonia increases with temperature.

A mixture of the present explosive composition containing more than about 20 percent of ammonia may be compounded from either solid particulate ammonium nitrate and ammonia or from an ammoniacal solution of ammonium nitrate and ammonia. But in any case an amount of ammonia in excess of that which will dissolve the ammonium nitrate at equilibrium under conditions of room temperature and atmospheric pressure must be employed in order to obtain a mixture with such a high ammonia content.

Explosive mixtures of the invention containing more than about 35 percent of liquid phase ammoniacal solution are to be preferred for pumping into a borehole as a slurry and are especially advantageously used in loading an elongated horizontal borehole.

If desired the explosive composition of the invention having as the liquid phase an ammoniacal solution of ammonium nitrate containing up to 15% of water may be thickened or stabilized upon admixing therewith from about 0.12 to 5 percent, based on the weight of the liquid phase, of a thickening agent such as methyl cellulose or gum karaya. Other suitable thickening agents are carboxymethyl cellulose, kava kava gum, guar gum, accroides gum, locust bean gum, balsam tolu natural, Irish moss, Iceland moss and Separan NP 10 (a high molecular weight polyacrylamide). The foregoing thickening agents are generally recognized as water soluble high molecular weight natural or synthetic gums which form sols when admixed with water. The effects of various thickening agents on the viscosity, respectively, of Diver's liquid and of the aqueous ammoniacal solution known as Spensol D were determined and the results are listed in Table IV.

TABLE IV

| Thickener | Weight Percent of Thickener | Viscosity of Ammoniacal Solution after Addition of Thickener (cps.) | |
|---|---|---|---|
| | | Diver's liquid | Spensol D |
| None | | 1.5 | 7.5 |
| Carboxymethyl cellulose extra high | 5 | >100,000 | >100,000 |
| Guar gum | 5 | 41 | >100,000 |
| Kava Kava gum | 5 | 5,100 | 450 |
| Accroides gum | 5 | | 120 |
| Locust Bean gum | 1 | | 18 |
| Do | 5 | | >100,000 |
| Balsam Tolu natural gum | 1 | | 20 |
| Benzoin Sumatra gum | 1 | | 12 |
| Irish moss | 5 | 121 | 60 |
| Iceland moss | 5 | | 42 |
| Separan NP 10 | 5 | | 140 |
| Methocel 70 HG | 0.125 | | 10 |
| Do | .25 | | 19 |
| Do | .5 | | 77 |
| Do | 1 | 900 | 315 |
| Do | 5 | >100,000 | 95,000 |
| Karaya gum | 0.125 | | 18 |
| Do | .25 | | 28 |
| Do | .5 | | 142 |
| Do | 1 | | 395 |
| Do | 5 | 84,000 | 4,000 |

Compositions containing these thickening agents in admixture are found to hold particles of ammonium nitrate and metal in suspension for a longer period than do unthickened compositions thus retaining greater homogeneity. As a result the mixtures detonate at somewhat more reproducible velocities than unthickened mixtures or slurries. Thickened slurries are somewhat safer to handle in that uniform dispersions are less sensitive to initiation by shock than are the solids settling out of a slurry or mixture. Thickened slurries possess the additional advantage that they lose less ammonia vapor when exposed to atmospheric conditions as in open containers and thus are less noxious to handle.

In detonating the explosive mixture of the invention a load or charge of the said mixture is placed in the desired location, usually in the confinement of a borehole, as a hole formed in an earth or rock formation or an ore body. A shaped charge, such as a Jet Perforator used in perforating oil well casings, is placed next to the load. The shaped charge is armed with a suitable initiator for the shaped charge, such as a No. 8 Electric Blasting Cap. The wire lead from the blasting cap is run to a remote control switch, and if desired, a sand or gravel tamp is placed over the load and initiators. The load is then fired from the remote control switch. In detonating a large load, such as one loaded into an elongated borehole, only one shaped charge is needed to detonate the entire load though more than one may be used if desired.

To demonstrate the insensitivity but inherent detonability of the ammonium nitrate explosive mixture of the invention several examples of the invention were prepared and tested in the following ways:

*Example I*

45 grams of granular fertilizer grade ammonium nitrate and 5 grams of atomized pellets of a magnesium alloy having the ASTM designation ZK10 were placed in a 4 oz. glass bottle and mixed manually. 50 grams of anhydrous Diver's liquid were then added to the so-prepared mixture. The bottle was left open at the top and a No. 8 Electric Blasting Cap was placed on top of the mixture and detonated. The ammonium nitrate mixture failed to detonate.

*Example II*

A second ammonium nitrate explosive mixture having the same composition as the above was similarly prepared in a 4 oz. glass bottle. The bottle was left open at the top and a shaped charge designated in the trade as a GG–2 was placed on the open bottle facing downward. The shaped charge was in turn activated by a No. 8 Electric Blasting Cap. The ammonium nitrate mixture was entirely detonated.

*Example III*

A shaped charge known as a GG–4 having attached thereto an Engineer Special Blasting Cap was placed facing upwardly at the bottom of a borehole in an earth formation, the borehole being 20 ft. deep and having a diameter of 5⅞ inches. 12.5 lbs. of atomized pellets of the magnesium base alloy, having the ASTM designation ZK10, were mixed thoroughly with 100 lbs. of granular fertilized grade ammonium nitrate. This mixture, concurrently with 112.5 lbs. of anhydrous Diver's liquid was poured into the said borehole and a second GG–4 shaped charge together with an Engineer Special Blasting Cap was placed atop the explosive mixture facing downwardly. Sufficient sand tamp to fill about 18 to 24 inches of the borehole was then placed over the load. Activation of the two shaped charges by the two blasting caps resulted in detonation of the entire load.

In additional tests to demonstrate the properties of the ammonium nitrate explosive mixture of the invention, various embodiments of the invention were prepared and tested. In each test a 10 to 25 pound quantity of explosive mixture was formulated of a particulated fertilizer grade of ammonium nitrate, a particulated metal and ammonia or an ammoniacal solution of ammonium nitrate in the proportions and amounts shown in the table. The individual proportions were in each case mixed in a separate polyethylene plastic bag of sufficient size to readily hold the quantity prepared. The various components of the mixture were weighed into the bag, the bag closed and the contents mixed by kneading the bag with the hands. The fertilizer grade of ammonium nitrate contained about 0.7 percent of wax, 1 percent of diatomaceous earth and 0.3 percent of chalk. The particle size of the ammonium nitrate was such that 94 percent by weight of the particles passed a 20 mesh sieve and 85 percent by weight were retained on a 100 mesh sieve. Flake aluminum used was a coarse grade which had been sieved so as to select the particulate metal passing a 40 mesh sieve but retained on an 80 mesh sieve. The atomized aluminum employed was of a particle size such that 0.4 percent *was retained on* [passed] a 40 mesh sieve, about 85 percent was retained on a 140 mesh sieve and about 0.9 percent passed a 200 mesh sieve. In some of the embodiments there was employed an atomized magnesium base alloy having the ASTM designation ZK10, the particle size range of the atomized magnesium base alloy being similar to that indicated hereinabove for atomized particles of ZK60 alloy. Anhydrous ammoniacal solutions of ammonium nitrate were prepared from fertilizer grade ammonium nitrate and liquid ammonia. Aqueous ammoniacal solutions of ammonium nitrate were obtained from a commercial source.

The prepared mixtures were loaded into individual shallow boreholes drilled in clay soil and having a diameter of 4 inches and a depth of about 4 feet. Successive boreholes were spaced about 20 feet apart. The loading of each hole was accomplished by first placing an initiator in the form of a shaped charge armed with a blasting cap at the bottom of the hole and running the lead wires of the cap to a firing control switch. Each shaped charge used was positioned with the jet end or firing axis facing upwardly. The explosive mixtures contained in the plastic bags in which they were mixed were dropped into respective test holes, the bags deforming so that the mixtures covered the initiator. Sand was used as a tamp, the hole being filled from the bag to ground level with sand. Detonation of the mixture was attempted by closing the firing switch thus setting off the initiator at the bottom of the hole. The magnitudes of the detonations obtained were determined by measuring the size of the crater produced. While the crater size alone is not indicative of the amount of earth formation that is broken up, it does give an indication of the work potential of the mixture detonated. The crater size herein reported shows how much material was thrown sufficiently so as not to fall back over the test hole.

Test conditions and results are summarized in Table V.

TABLE V

| Test No. | Composition, percent | | | | | | | Wt. of Load, lbs. | Initiator | | Crater Dimensions, ft. | |
|---|---|---|---|---|---|---|---|---|---|---|---|---|
| | FGAN | Al | ZK10, A. | $NH_3$ | Diver's Liquid | S.D. | Thickener* | | Blasting Cap | Shaped charge, Wt. of RDX (oz.) | Diameter | Depth |
| 1 | 83.7 | | 9.3 | 7 | | | | 25 | #8 E.B.C. | 1 | 9 | 1.5 |
| 2 | 87.9 | | 9.8 | 2.3 | | | | 10 | #8 E.B.C. | 1 | 7 | 2.5 |
| 3 | 87.9 | 9.8 A. | | 2.3 | | | | 10 | #8 E.B.C. | 1 | 8 | 3 |
| 4 | 75 | 8.3 A. | | | | 16.7B | | 12 | #8 E.B.C. | 1 | 7 | 1 |
| 5 | 80 | 15 A. | | 5 | | | | 10 | #8 E.B.C. | 1 | 9 | 5 |
| 6 | 93 | 2 A. | | 5 | | | | 10 | #8 E.B.C. | 1 | 5 | 1 |
| 7 | 45 | | 5 | | 50 | | | 10 | #8 E.B.C. | 3.25 | 7 | 2.5 |
| 8 | 45 | 45 A. | | | | 10 | | 10 | #8 E.B.C. | 3.25 | 14 | 3 |
| 9 | 30 | 55 A. | | | | 15 | | 10 | #8 E.B.C. | 3.25 | 14 | 3 |
| 10 | 20 | 55 A. | | | | 25 | | 10 | #8 E.B.C. | 3.25 | 12 | 3 |
| 11 | 90 | 5 A. | | | | 5 | | 10 | #8 E.B.C. | 3.25 | 11 | 4 |
| 12 | 80 | 10 A. | | | | 10 | 1/4 | 10 | #8 E.B.C. | 3.25 | 12 | 3 |
| 13 | 80 | 10 A. | | | | 10 | 1/2 | 10 | #8 E.B.C. | 3.25 | 8 | 2.5 |
| 14 | 90 | 5 A. | | | | 5 | 1/4 | 10 | #8 E.B.C. | 3.25 | 12 | 1.5 |
| 15 | 80 | 15 A. | | | | 5 | 1/4 | 10 | #8 E.B.C. | 3.25 | 20 | 4 |
| 16 | 75 | 15 A. | | | | 10 | 1/4 | 10 | #8 E.B.C. | 3.25 | 10 | 4 |
| 17 | 60 | 35 A. | | | | 5 | | 10 | #8 E.B.C. | 3.25 | 18 | 5 |
| 18 | 60 | 25 A. | | | | 15 | | 10 | #8 E.B.C. | 3.25 | 20 | 2.5 |
| 19 | 10 | 65 A. | | | | 25 | | 10 | #8 E.B.C. | 3.25 | 14 | 2 |
| 20 | 72 | 22 F. | | | | 6B | | 10 | #8 E.B.C. | 1 | 12 | 4 |

* = Weight percent of thickener based on weight of liquid phase.
A. = Atomized.
F. = Flake.
S.D. = Spensol D.
B = Solution similar to Spensol D but containing about 15% of water.
FGAN = Fertilizer grade $NH_4NO_3$.

The results in Table V show that a broad range of compositions within the scope of the invention are detonable upon initiation with a shaped charge.

In order to compare the composition of the invention with conventional explosives varied amounts of 60% dynamite each with a No. 8 Electric Blasting Cap therefor were placed in shallow test holes 4 feet deep, tamped with sand and detonated. 5 lbs. of dynamite so loaded and detonated produced a crater 5 feet in diameter and 1.5 feet deep; 10 lbs. of dynamite produced a crater 8 feet in diameter and 1 foot deep; while 25 lbs. of dynamite produced a crater 11 feet in diameter and 5 feet deep.

In still another test series additional embodiments of the invention were compounded. Each mixture was used to entirely fill a 3 inch by 12 inch steel pipe nipple which was capped on both ends and laid on the ground. The charge was initiated by a shaped charge containing 3.25 oz. of RDX which was positioned at one end of the nipple so as to fire longitudinally into the nipple. Compositions tested and results obtained are summarized in Table VI.

TABLE VI

| Test No. | Composition, Percent | | | | Weight of Charge, lbs. | Results of Detonation |
|---|---|---|---|---|---|---|
| | FGAN | Al, A. | ZK10, A. | $NH_3$ | | |
| 21 | 50 | 5 | | 45 | 3.75 | Pipe nipple split. |
| 22 | 35 | 35 | | 30 | 3 | Do. |
| 23 | 50 | | 40 | 10 | 4.8 | Pipe nipple destroyed. |
| 24 | 60 | 20 | | 20 | 3.25 | Do. |

A. = Atomized.
FGAN = Fertilizer grade $NH_4NO_3$.

Among the advantages of the invention are the elimination of the need for boosters spaced throughout an extensive ammonium nitrate load, thereby simplifying the loading of a charge of the explosive mixture.

What is claimed is:

1. An explosive composition comprising from 20 to 95 percent by weight of ammonium nitrate, from 1 to 65 percent by weight of a solid light metal in particulate form, said particulate metal having a particle size of from about 20 to 140 mesh, not more than 1 percent of the said metal particles passing a 200 mesh sieve, from 2 to 50 percent by weight of ammonia and not more than 6 percent by weight of water, at least a portion of said ammonium nitrate being present as an ammoniacal solution of ammonium nitrate and the remainder of the ammonium nitrate being present in solid particulate form in a particle size ranging from about 8 to 100 mesh, and said solid light metal being selected from the group consisting of magnesium, magnesium-base alloys, aluminum, aluminum-base alloys and mixtures thereof.

2. The composition as in claim 1 in which the solid light metal is selected from magnesium-base alloys.

3. The composition as in claim 1 in which the said solid particulate ammonium nitrate is in prilled form.

4. An explosive composition comprising from 20 to 95 percent by weight of ammonium nitrate, from 1 to 65 percent by weight of a solid light metal in particulate form, said particulate metal having a particle size of from about 20 to 140 mesh, not more than 1 percent of the said metal particles passing a 200 mesh sieve, from 2 to 50 percent by weight of ammonia and not more than 6 percent by weight of water, at least a portion of said ammonium nitrate being present as an ammoniacal solution of ammonium nitrate and the remainder of the ammonium nitrate being present in solid particulate form in a particle size ranging from about 8 to 100 mesh, said solid light metal being selected from the group consisting of magnesium, magnesium-base alloys, aluminum, aluminum-base alloys and mixtures thereof, and said composition being admixed with from 0.12 to 5 percent, based on the weight of the liquid phase, of a thickening agent consisting of a water soluble, high molecular weight gum which forms a sol when admixed with water.

5. An explosive composition comprising from 20 to 95 percent by weight of ammonium nitrate, from 1 to 65 percent by weight of a solid light metal in particulate form, said particulate metal having a particle size of from about 20 to 140 mesh, not more than 1 percent of the said metal particles passing a 200 mesh sieve, from 2 to 50 percent by weight of ammonia and not more than 6 percent by weight of water, at least a portion of said ammonium nitrate being present as an ammoniacal solution of ammonium nitrate and the remainder of the ammonium nitrate being present in solid particulate form in a particle size ranging from about 8 to 100 mesh, said solid light metal being selected from the group consisting of magnesium, magnesium-base alloys, aluminum, aluminum-base alloys and mixtures thereof, and said composition being admixed with about 0.25 percent of gum karaya based on the weight of the liquid phase.

6. An explosive composition comprising from 20 to 95 percent by weight of ammonium nitrate, from 1 to 65 percent by weight of a solid light metal in particulate form, said particulate metal having a particle size of from about 20 to 140 mesh, not more than 1 percent of the said metal particles passing a 200 mesh sieve, from 2 to 50 percent by weight of ammonia and not more than 6 percent by weight of water, at least a portion of said ammonium nitrate being present as an ammoniacal solution of ammonium nitrate and the remainder of the ammonium nitrate being present in solid particulate form in a particle size ranging from about 8 to 100 mesh, said solid light metal being selected from the group consisting of magnesium, magnesium-base alloys, aluminum, aluminum-base alloys and mixtures thereof, and said composition being admixed with about 0.5 percent of methyl cellulose based on the weight of the liquid phase.

7. An explosive composition consisting essentially of from 50 to 90 percent by weight of ammonium nitrate, from 1 to 20 percent by weight of a solid light metal in particulate form, said particulate metal having a particle size of from about 28 to 100 mesh, not more than 1 percent of the said metal particles passing a 200 mesh sieve, from 2 to 30 percent by weight of ammonia and not more than 6 percent *by weight* of water, at least a portion of said ammonium nitrate being present as an ammoniacal solution of ammonium nitrate and the remainder of the ammonium nitrate being present in solid particulate form in a particle size ranging from about 8 to 100 mesh, and said solid light metal being selected from the group consisting of magnesium, magnesium-base alloys, aluminum, aluminum-base alloys, and mixtures thereof.

8. An explosive composition comprising from 50 to 90 percent by weight of ammonium nitrate, from 3 to 10 percent by weight of a solid light metal in particulate form, said particulate metal having a particle size of from about 28 to 100 mesh, not more than 1 percent of the said metal particles passing a 200 mesh sieve, from 2 to 30 percent by weight of ammonia and not more than 6 percent by weight of water at least a portion of said ammonium nitrate being present as an ammoniacal solution of ammonium nitrate and the remainder of the ammonium nitrate being present in solid particulate form in a particle size ranging from about 8 to 100 mesh, and said solid light metal being selected from the group consisting of magnesium, magnesium-base alloys, aluminum, aluminum-base alloys, and mixtures thereof.

References Cited

The following references, cited by the Examiner, are of record in the patented file of this patent or the original patent.

UNITED STATES PATENTS

| | | |
|---|---|---|
| 1,992,217 | 2/1935 | Kirst et al. |
| 2,168,562 | 8/1939 | Davis. |
| 2,393,594 | 1/1946 | Davis. |
| 2,703,528 | 3/1955 | Lee et al. |
| 2,860,041 | 11/1958 | Griffith et al. |
| 2,903,969 | 9/1959 | Kolbe. |

BENJAMIN R. PADGETT, *Primary Examiner.*